United States Patent
Lv

(10) Patent No.: US 9,208,303 B2
(45) Date of Patent: Dec. 8, 2015

(54) MOBILE TERMINAL AND APPLICATION PROGRAM LOGIN METHOD THEREOF

(75) Inventor: Zhonglei Lv, Huizhou (CN)

(73) Assignee: HUIZHOU TCL MOBILE COMMUNICATIONS CO., LTD., Huizhou (CN)

( * ) Notice: Subject to any disclaimer, the term of this patent is extended or adjusted under 35 U.S.C. 154(b) by 184 days.

(21) Appl. No.: 14/006,072

(22) PCT Filed: Jul. 10, 2012

(86) PCT No.: PCT/CN2012/078428
§ 371 (c)(1),
(2), (4) Date: Sep. 18, 2013

(87) PCT Pub. No.: WO2013/029428
PCT Pub. Date: Mar. 7, 2013

(65) Prior Publication Data
US 2014/0013424 A1    Jan. 9, 2014

(30) Foreign Application Priority Data

Aug. 29, 2011   (CN) .......................... 2011 1 0251233

(51) Int. Cl.
| | | |
|---|---|---|
| *G06F 21/32* | (2013.01) | |
| *H04W 12/06* | (2009.01) | |
| *G06F 21/40* | (2013.01) | |
| *H04W 12/08* | (2009.01) | |
| *G06K 9/00* | (2006.01) | |
| *H04W 88/02* | (2009.01) | |
| *H04L 29/06* | (2006.01) | |
| *H04M 1/67* | (2006.01) | |

(52) U.S. Cl.
CPC ................ *G06F 21/32* (2013.01); *G06F 21/40* (2013.01); *H04L 63/0861* (2013.01); *H04W 12/06* (2013.01); *G06K 9/00* (2013.01);
(Continued)

(58) Field of Classification Search
USPC .................................... 726/19; 713/186, 155
See application file for complete search history.

(56) References Cited

U.S. PATENT DOCUMENTS

| 2003/0220097 A1 | 11/2003 | Aono et al. |
| 2004/0128521 A1 | 7/2004 | Russo |

(Continued)

FOREIGN PATENT DOCUMENTS

| CN | 1453701 | 11/2003 |
| CN | 1668003 A | 9/2005 |

(Continued)

OTHER PUBLICATIONS

International Search Report for PCT/CN2012/078428, citing the above reference(s).

*Primary Examiner* — Jeffrey Pwu
*Assistant Examiner* — Samuel Ambaye
(74) *Attorney, Agent, or Firm* — Hauptman Ham, LLP

(57) ABSTRACT

The present invention discloses a mobile terminal and an application program login method thereof. The method includes acquiring the to-be-authenticated fingerprint information inputted by a user when the user is required to log into an application program; determining whether the to-be-authenticated fingerprint information is the same as a correct fingerprint information which is locally preset and corresponds to the application program; if yes, then acquiring, according to the identifying fingerprint information, a user name and a password corresponding to the application program from a login information file which is locally preset; and logging into the application program according to the user name and the password. By logging into the application program via fingerprint, the present invention not only ensures the security of personal information, but also allows the user to quickly log into the application program, thereby improving user experience.

14 Claims, 3 Drawing Sheets

(52) U.S. Cl.
CPC ............ *H04L 63/0815* (2013.01); *H04M 1/67* (2013.01); *H04W 12/08* (2013.01); *H04W 88/02* (2013.01)

(56) References Cited

U.S. PATENT DOCUMENTS

| | | | |
|---|---|---|---|
| 2007/0140530 A1 | 6/2007 | Coogan | |
| 2008/0016371 A1* | 1/2008 | Jiang et al. | 713/186 |
| 2010/0231356 A1* | 9/2010 | Kim | 340/5.83 |
| 2011/0025626 A1 | 2/2011 | Inami | |
| 2011/0050392 A1* | 3/2011 | Kaizu | 340/5.52 |
| 2011/0287741 A1* | 11/2011 | Prabhu | 455/411 |

FOREIGN PATENT DOCUMENTS

| | | |
|---|---|---|
| CN | 101097517 | 1/2008 |
| CN | 101140609 A | 3/2008 |
| CN | 101383704 A | 3/2009 |
| CN | 102281539 | 12/2011 |

\* cited by examiner

MOBILE TERMINAL AND APPLICATION PROGRAM LOGIN METHOD THEREOF

CROSS REFERENCE TO RELATED APPLICATION

This application claims the priority of Chinese Patent Application No. 201110251233.5, filed on Aug. 29, 2011 in the SIPO (State Intellectual Property Office of the P.R.C.). Further, this application is the National Phase application of International Application No. PCT/CN2012/078428 filed on Jul. 10, 2012, which designates the United States.

TECHNICAL FIELD OF THE INVENTION

The present invention relates to a mobile terminal technology, and more particularly, to a mobile terminal and an application program login method thereof.

BACKGROUND OF THE INVENTION

As an outgrowth of the technology, a mobile terminal is equipped with more and more application programs. Most application programs, such as instant messaging software services (e.g., QQ, and Fetion) and Email, require a user to log in by manually inputting login verifications including a user name and a password. This login process is a miscellaneous or tedious process. Most application programs have a function of "remembering user name and password", and can be logged in by clicking one button at next login. However, this login process is not secure. Another user is easy to see the personal information that he/she should not perceive. This causes unnecessary troubles.

How to quickly log into various application programs on the premise that the security of personal information is ensured is a difficult problem required to be solved in this field.

SUMMARY OF THE INVENTION

The technical problem to be solved in the present invention is to provide a mobile terminal and an application program login method thereof, for quickly logging into various application programs on the premise that the security of personal information is ensured. The present invention can solve the above technical problem efficiently.

The technical scheme adopted in the present invention for solving the above technical problem is to provide a mobile terminal, which comprises an application login module, a fingerprint identification module, an indication module, an application management module, and an intelligent login module. The application login module is used for acquiring one or more to-be-authenticated fingerprint information inputted by a user when the user is required to log into one or more application programs that require login authentication. The fingerprint identification module is used for determining whether the to-be-authenticated fingerprint information acquired by the application login module is the same as a correct fingerprint information which is locally preset and corresponds to the application program. Specifically, the fingerprint identification module comprises a first acquisition unit, a determination unit, and a second acquisition unit. The first acquisition unit is used for acquiring a correct fingerprint information corresponding to a first application program when the to-be-authenticated fingerprint information inputted by the user is a single one. The determination unit is used for determining whether the to-be-authenticated fingerprint information is the same as the correct fingerprint information which corresponds to said application program and is acquired by the first acquisition unit. The second acquisition unit is used for acquiring a correct fingerprint information corresponding to a next application program. Also, the determination unit determines whether the to-be-authenticated fingerprint information is the same as the correct fingerprint information corresponding to said application program until a final application program that the user is required to log in. The indication module is used for recording that the fingerprint information authentication of the application program is invalid when the fingerprint identification module determines that the to-be-authenticated fingerprint information acquired by the application login module is different from the correct fingerprint information which is locally preset and corresponds to the application program. The application management module is used for acquiring, according to the to-be-authenticated fingerprint information, a user name and a password corresponding to the application program from a login information file which is locally preset when the fingerprint identification module determines that the to-be-authenticated fingerprint information is the same as the correct fingerprint information corresponding to the application program. The intelligent login module is used for logging into the application program according to the user name and the password acquired by the application management module.

Amongst, the mobile terminal further comprises a traditional login module, which is used for launching a traditional login interface for prompting the user to log in by inputting the user name and the password when a repeat count of acquisition by the application login module reaches a preset threshold.

Another technical scheme adopted in the present invention for solving the above technical problem is to provide a mobile terminal, which comprises an application login module for acquiring one or more to-be-authenticated fingerprint information inputted by a user when the user is required to log into one or more application programs that require login authentication; a fingerprint identification module for determining whether the to-be-authenticated fingerprint information acquired by the application login module is the same as a correct fingerprint information which is locally preset and corresponds to the application program; an application management module for acquiring, according to the to-be-authenticated fingerprint information, a user name and a password corresponding to the application program from a login information file which is locally preset when the fingerprint identification module determines that the to-be-authenticated fingerprint information is the same as the correct fingerprint information corresponding to the application program; an intelligent login module for logging into the application program according to the user name and the password acquired by the application management module.

Amongst, the fingerprint identification module comprises a first acquisition unit for acquiring a correct fingerprint information corresponding to a first application program when the to-be-authenticated fingerprint information inputted by the user is a single one; a determination unit for determining whether the to-be-authenticated fingerprint information is the same as the correct fingerprint information which corresponds to said application program and is acquired by the first acquisition unit; a second acquisition unit for acquiring a correct fingerprint information corresponding to a next application program, the determination unit determining whether the to-be-authenticated fingerprint information is the same as the correct fingerprint information corresponding to said application program until a final application program that the user is required to log in.

Amongst, the mobile terminal further comprises an indication module, which is used for recording that the fingerprint information authentication of the application program is invalid when the fingerprint identification module determines that the to-be-authenticated fingerprint information acquired by the application login module is different from the correct fingerprint information which is locally preset and corresponds to the application program.

Amongst, the mobile terminal further comprises a traditional login module, which is used for launching a traditional login interface for prompting the user to log in by inputting the user name and the password when a repeat count of acquisition by the application login module reaches a preset threshold.

Amongst, the fingerprint identification module comprises an acquisition unit for acquiring the correct fingerprint information corresponding to one or more application programs that the user is required to log in when the to-be-authenticated fingerprint information inputted by the user includes two or more than two entities; a determination unit for comparing the to-be-authenticated fingerprint information respectively with the correct fingerprint information corresponding to one application program and determining whether they are the same when the number of application programs the user is required to log in is one, and comparing the to-be-authenticated fingerprint information respectively with the correct fingerprint information corresponding to plural application programs and determining whether they are the same when the number of application programs the user is required to log in is two or more than two.

Still another technical scheme adopted in the present invention for solving the above technical problem is to provide an application program login method, which comprises steps of: acquiring one or more to-be-authenticated fingerprint information inputted by a user when the user is required to log into one or more application programs that require login authentication; determining whether the to-be-authenticated fingerprint information is the same as a correct fingerprint information which is locally preset and corresponds to the application program; according to the to-be-authenticated fingerprint information, acquiring a user name and a password corresponding to the application program from a login information file which is locally preset if the to-be-authenticated fingerprint information is the same as the correct fingerprint information corresponding to the application program; and logging into the application program according to the user name and the password.

Amongst, the step of determining whether the to-be-authenticated fingerprint information is the same as the correct fingerprint information which is locally preset and corresponds to the application program comprises: if the to-be-authenticated fingerprint information inputted by the user is a single one, acquiring a correct fingerprint information corresponding to a first application program; determining whether the to-be-authenticated fingerprint information is the same as the correct fingerprint information corresponding to said application program; if not the same, acquiring a correct fingerprint information corresponding to a next application program and processing the step of determining whether the to-be-authenticated fingerprint information is the same as said correct fingerprint information corresponding to said application program until a final application program that the user is required to log in; if the same, processing the step of acquiring, according to the to-be-authenticated fingerprint information, the user name and the password corresponding to the first application program from the login information file which is locally preset, and then acquiring the correct fingerprint information corresponding to the next application program and processing the step of determining whether the to-be-authenticated fingerprint information is the same as the correct fingerprint information corresponding to said application program until the final application program that the user is required to log in.

Amongst, before the step of acquiring the correct fingerprint information corresponding to the next application program if not the same, said method further comprises: recording that the fingerprint information authentication of the application program is invalid if not the same; after processing a step of determining whether the to-be-authenticated fingerprint information is the same as the correct fingerprint information corresponding to the final application program and processing corresponding steps according to the determination result, said method further comprises: repeating acquisition of the to-be-authenticated fingerprint information inputted by the user and the correct fingerprint information corresponding to the recorded application program of which the fingerprint information authentication is invalid, and then processing the step of determining whether the to-be-authenticated fingerprint information is the same as the correct fingerprint information corresponding to said application program until a repeat count of acquisition reaches a preset threshold, or until the user ceases logging into the application program.

Amongst, if the repeat count of acquisition reaches the preset threshold, launch a traditional login interface for prompting the user to log in by inputting the user name and the password.

Amongst, the step of determining whether the to-be-authenticated fingerprint information is the same as the correct fingerprint information which is locally preset and corresponds to the application program comprises: if the to-be-authenticated fingerprint information inputted by the user includes two or more than two entities, acquiring the correct fingerprint information corresponding to one or more application programs that the user is required to log in; if the number of application programs the user is required to log in is one, then comparing the to-be-authenticated fingerprint information respectively with the correct fingerprint information corresponding to the one application program and determining whether they are the same; if the number of application programs the user is required to log in is two or more than two, then comparing the to-be-authenticated fingerprint information respectively with the correct fingerprint information corresponding to the plural application programs and determining whether they are the same.

Compared to the conventional skills, the beneficial effects of the present invention are that: by logging into the application program with fingerprint, the mobile terminal of the present invention and the application program login method thereof not only ensure the security of personal information, but also allows the user to quickly log into the application program. This improves user experience and is more practical.

DETAILED DESCRIPTION OF THE INVENTION

Figure 1:
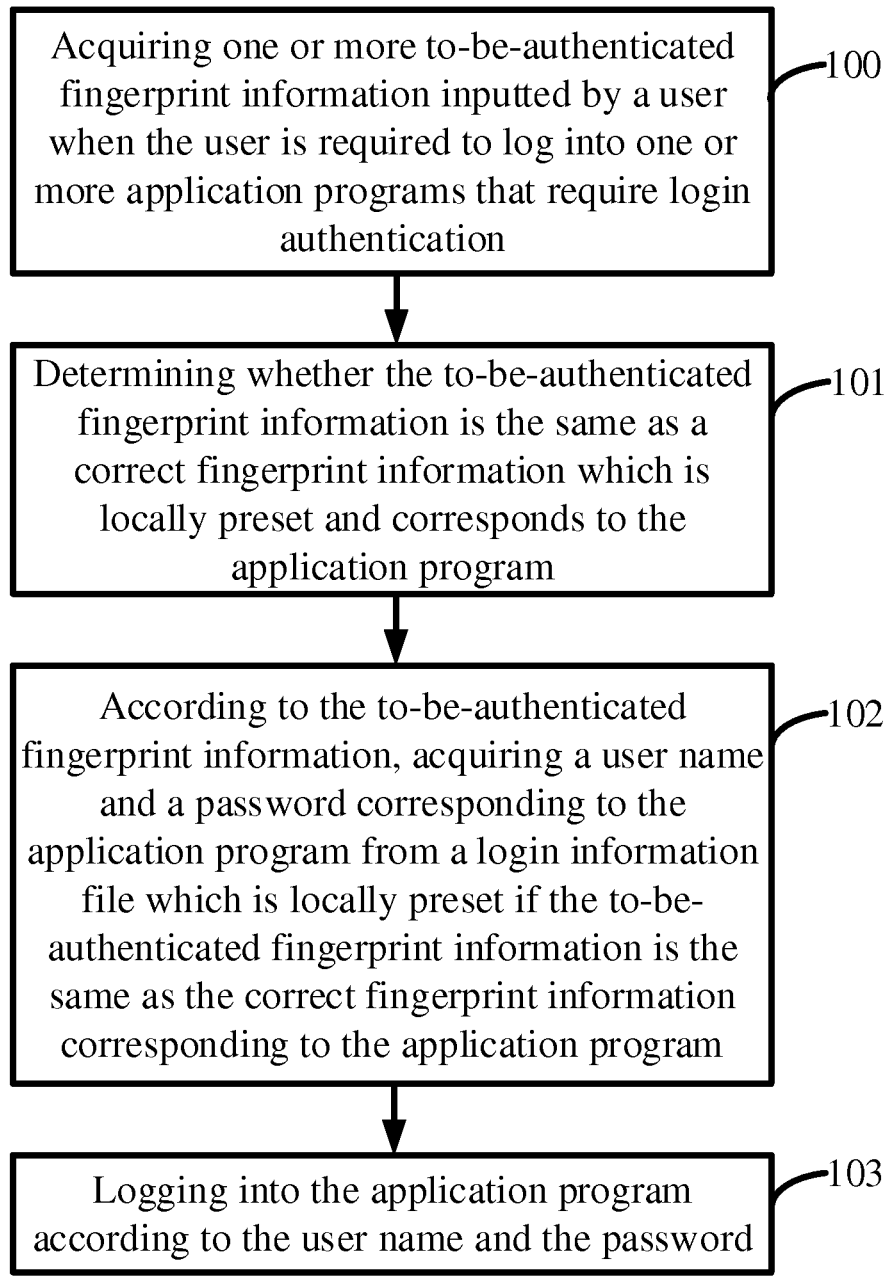
FIG. 1 is a flow chart of a mobile terminal application program login method according to a preferred embodiment of the present invention.

Referring to FIG. 1, an application program login method for a mobile terminal according to a first embodiment of the present invention comprises following steps.

In Step 100, one or more to-be-authenticated fingerprint information inputted by a user is acquired when the user is required to log into one or more application programs that require login authentication.

In Step 101, whether the to-be-authenticated fingerprint information is the same as a correct fingerprint information which is locally preset and corresponds to the application program is determined.

In Step 102, if the to-be-authenticated fingerprint information is the same as the correct fingerprint information corresponding to the application program, a user name and a password corresponding to the application program are acquired from a login information file which is locally preset, according to the to-be-authenticated fingerprint information.

In Step 103, log into the application program according to the user name and the password.

By utilizing the present embodiment, the user can log into plural application programs or plural accounts of the same application program quickly and securely. This improves user experience and is more practical.

Figure 2:
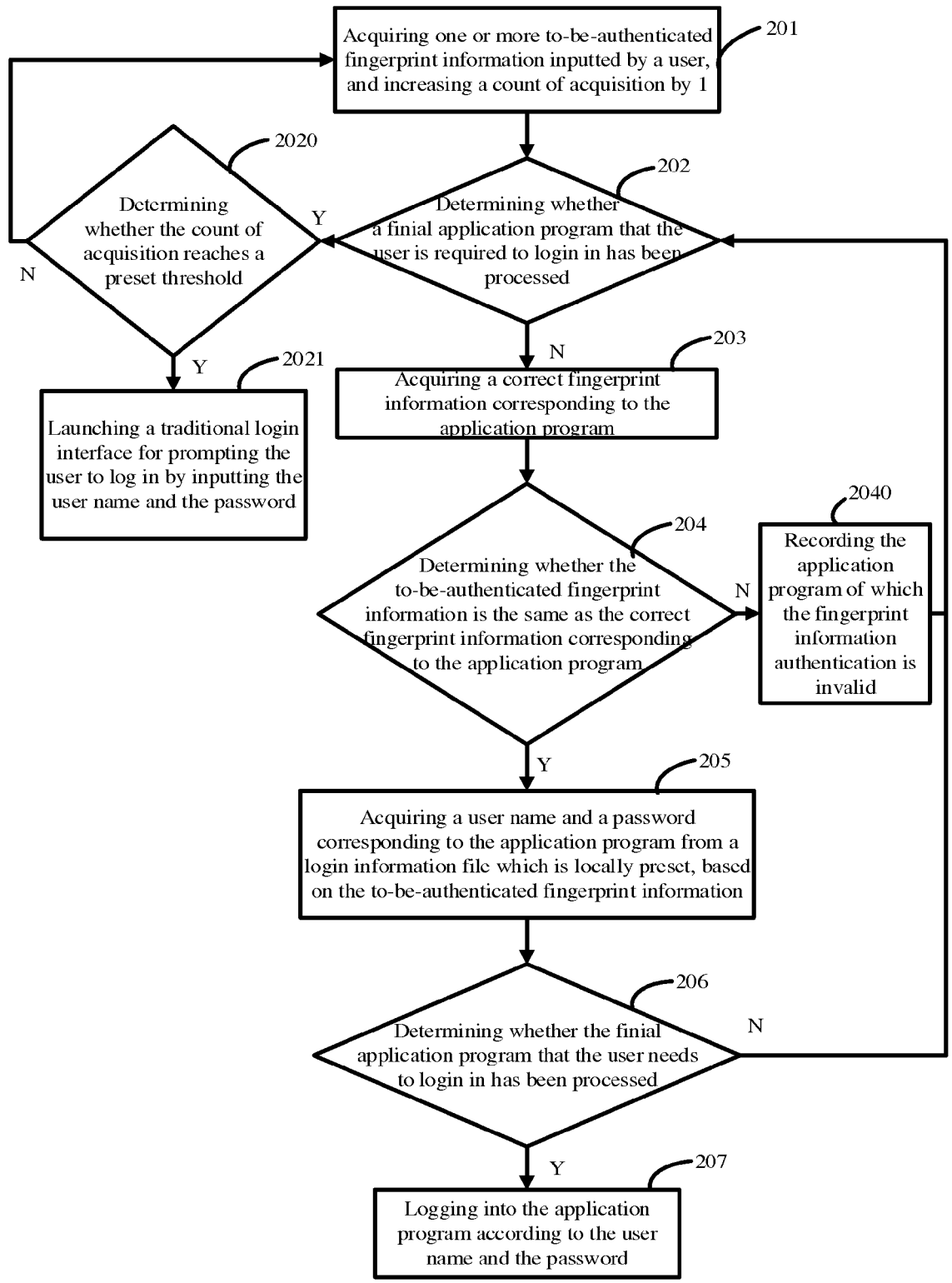
FIG. 2 is a flow chart of a particular case of the mobile terminal application program login method shown in FIG. 1.

Referring to FIG. 2, an application program login method for a mobile terminal according to a second embodiment of the present invention comprises following steps.

Step 201: acquiring one or more to-be-authenticated fingerprint information inputted by a user, and increasing a count of acquisition by 1.

In Step 201, if the to-be-authenticated fingerprint information inputted by the user is a single one, then a correct fingerprint information corresponding to a first application program is acquired; if the to-be-authenticated fingerprint information inputted by the user includes two or more than two entities, then the correct fingerprint information corresponding to one or more application programs that the user is required to log in is acquired.

Step 202: determining whether a finial application program that the user is required to login in has been processed.

Step 202 is mainly used for processing plural application programs or plural to-be-authenticated fingerprint information inputted by the user. In Step 202's looping execution, when the user selects m application programs and inputs n to-be-authenticated fingerprint information, they are recorded as values m and n. During processing the application programs and the to-be-authenticated fingerprint information, based on the number of processed application programs M or the number of processed to-be-authenticated fingerprint information N, the value m is compared with the value M so as to determine whether all the application programs have been processed, or the value n is compared with the value N so as to determine whether all the to-be-authenticated fingerprint information has been processed. Of course, parallel processing is also available, e.g., proceeding with a one-time multithreading procedure. The present invention is not limited thereto.

Step 203: acquiring a correct fingerprint information corresponding to the application program.

In Step 203, when the determination of Step 202 indicates that the final application program that the user is required to log in has not been processed, acquire the correct fingerprint information corresponding to the application program that the user is required to log in. For example, at first, acquire a correct fingerprint information corresponding to a first application program. If this information is the same as the to-be-authenticated fingerprint information, then log into the first application program. Next, acquire a correct fingerprint information corresponding to a second application program and proceed with the determination until the determination of Step 202 indicates that the final application program has been processed. Then, Step 203 is terminated. Of course, when data interface permits, it also can simultaneously acquire the correct fingerprint information corresponding to plural application programs and proceed with the determination at the same time for accelerating the determination speed. The present invention is not limited thereto.

Step 204: determining whether the to-be-authenticated fingerprint information is the same as the correct fingerprint information corresponding to the application program.

In Step 204, the user can proceed with scanning and image processing for the to-be-authenticated fingerprint information by using a fingerprint capturer, and then compare a to-be-authenticated fingerprint image with a correct fingerprint image which is locally preset. Specifically, based on the comparison of local feature of the fingerprint, such as ridge ending, bifurcation, and short ridge, whether the to-be-authenticated fingerprint information is the same as the correct fingerprint information corresponding to the application program can be determined.

Step 205: acquiring a user name and a password corresponding to the application program from a login information file which is locally preset, based on the to-be-authenticated fingerprint information.

In Step 205, if the determination of Step S204 indicates that the to-be-authenticated fingerprint information is the same as the correct fingerprint information corresponding to the application program, then acquire a user name and a password from a local login information file, which is a file preset by the user. For example, it generally needs to input a user name and a password when the user logs in for the first time. After logged in successfully, an application management program will prompt the user whether to bind the fingerprint for easy login with the fingerprint next time. Meanwhile, once the user inputs clear and effective fingerprint information, binding with the user name and the password is achieved and the fingerprint information is determined as sole effective and correct fingerprint information. In addition, after binding with the user name and the password, the correct fingerprint information is correspondingly preserved in the local login information file database. Of course, the user also can bind the fingerprint information on his/her own initiative after finishing downloading some particle application program.

Step 206: determining whether the finial application program that the user is required to login in has been processed.

Step 206 and Step 202 co-ordinate with each other and form an effective loop, which is mainly used for processing plural application programs or plural to-be-authenticated fingerprint information inputted by the user. In Step 202's looping execution, when the user selects m application programs and inputs n to-be-authenticated fingerprint information, they are recorded as values m and n. During processing the application programs and the to-be-authenticated fingerprint information, based on the number of processed application programs M or the number of processed to-be-authenticated fingerprint information N, the value m is compared with the value M so as to determine whether all the application programs have been processed, or the value n is compared with the value N so as to determine whether all the to-be-authenticated fingerprint information has been processed.

Step 207: logging into the application program according to the user name and the password, and ceasing or waiting the user's other operations.

In Step 207, the number of application programs the user logs in based on the user name and the password read from Step 205 is one or more than one. The login procedure generally ends here. However, there may exist special situations. For example, an interface may pop up for prompting the user whether to change the correct fingerprint information which is locally preset, and this is mainly for facilitating centralized management. After logged in successfully, it only needs to select "Change", input new fingerprint information, and then confirm it when changing the correct fingerprint information.

Step 2020: determining whether the count of acquisition reaches a preset threshold.

A threshold limiting a frequency count that an error fingerprint is inputted is preset on the local end of the mobile terminal. The preset threshold is a natural number smaller than 10. In another perspective, after the same user inputs the to-be-authenticated fingerprint information for 10 times, it can be determined as other users' illegal activities if all the to-be-authenticated fingerprint information is different from the reacquired correct fingerprint information. Meanwhile, ceasing operating is a choice, or another operation is prohibited for a certain period of time. By the arrangement of threshold, the security of personal information is increased.

Step 2021: launching a traditional login interface for prompting the user to log in by inputting the user name and the password, and ceasing or waiting the user's other operations.

Step 2021 is mainly used to avoid some particular situations. For example, the user is away from the terminal and requires another user's aid to log into the application program that the user desires to log in. Alternatively, the user can log in manually via the traditional login interface if the user's hand cannot provide fingerprint as usual.

Step 2040: recording the application program of which the fingerprint information authentication is invalid, and going back to Step 202.

Step 2040 is used for a situation that the to-be-authenticated fingerprint information and the correct fingerprint information are different from each other. Of course, repeating acquisition of the to-be-authenticated fingerprint information is merely a specific case. In other embodiments, if they are not the same, no further action is taken. However, after logging into the application programs with valid verification, the application programs of which the verification is invalid are presented so as to prompt the user to proceed with another operation.

In addition, if the number of application programs the user is required to log in is one, then compare the to-be-authenticated fingerprint information respectively with the correct fingerprint information corresponding to the one application program and determine whether they are the same. This situation can be regarded as improper user handling that plural to-be-authenticated fingerprint information is inputted. Alternatively, the user forgets which finger the correct fingerprint corresponding to one of the application programs belongs to. By inputting plural fingerprints at one time in this process, the present invention can proceed with the determination and allow the user to log into the application program quickly, thereby reducing complex processes, such as reentering information.

If the number of application programs the user is required to log in is two or more than two, then compare the to-be-authenticated fingerprint information respectively with the correct fingerprint information corresponding to the plural application programs and determine whether they are the same.

In the above-described method, for convenience of the user, it also can set a same correct fingerprint information for the usernames and passwords of plural application programs, and then bind and preserve them. Once the user selects the plural application programs and inputs the to-be-authenticated fingerprint information corresponding to the correct fingerprint information at the time the user logs in, logging into the plural application programs at one time is achieved.

For a situation that plural application programs and plural correct fingerprint information are utilized, the present invention also can be added with a prompt step. In the prompt step, icon colors of the application programs having the same correct fingerprint information are changed to the same color for convenience of multiple selection. For example, when the user selects an application program A, an application program B, an application program E, and an application program G that have the same correct fingerprint information will be highlighted with the same color in the prompt step, and displayed to the user.

Of course, in addition to the above situation, the present invention also can comprise a selection step. That is, during the user logs into one or more application programs that requires login authentication, if the user chooses to input the to-be-authenticated fingerprint information first, then local correct fingerprint information is read out according to the to-be-authenticated fingerprint information and the respective application programs that the to-be-authenticated fingerprint information can be used to log into are shown in bold for prompting the user to select. By utilizing this process, the determination steps can be decreased as compared to the case that the application programs are randomly selected, thereby reducing the operation time.

In another embodiment, with respect to plural accounts of the same application program, the present invention needs to set plural corresponding correct fingerprint information, in order to increase the security of personal information. For example, when the user is required to log into an application program QQ with plural QQ numbers, it is necessary to preserve plural correct fingerprint information respectively for the plural QQ numbers in advance. Once the user launches the application program QQ and inputs plural to-be-authenticated fingerprint information corresponding to the plural correct fingerprint information, it is achieved that the user logs into the application program QQ with the plural QQ numbers at one time.

By utilizing the present embodiment, the user can log into plural application programs or plural accounts of the same application program quickly and securely. This improves user experience and is more practical.

Figure 3:
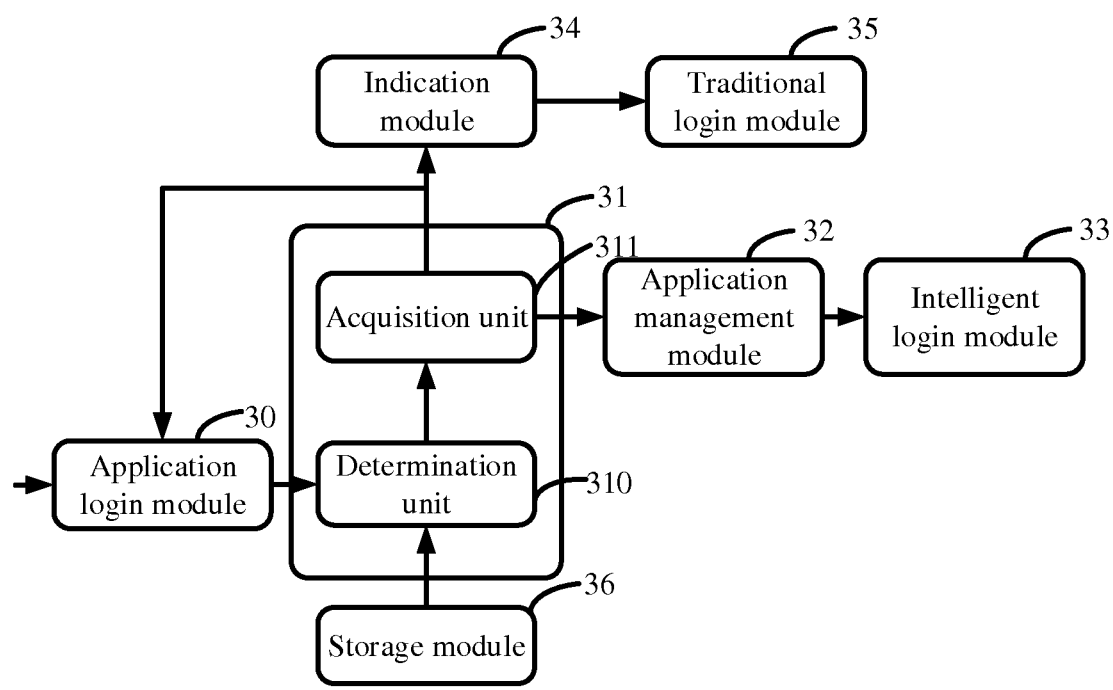
FIG. 3 is a schematic diagram showing connections between modules of a mobile terminal according to a preferred embodiment of the present invention.

Referring to FIG. 3, a mobile terminal of the present invention comprises the following.

An application login module 30 is used for acquiring one or more to-be-authenticated fingerprint information inputted by a user when the user is required to log into one or more application programs that require login authentication.

A fingerprint identification module 31 is used for determining whether the to-be-authenticated fingerprint information acquired by the application login module 30 is the same as a correct fingerprint information which is locally preset and corresponds to the application program.

An application management module 32 is used for acquiring, according to the to-be-authenticated fingerprint information, a user name and a password corresponding to the application program from a login information file which is locally preset when the fingerprint identification module 31 determines that the to-be-authenticated fingerprint information is the same as the correct fingerprint information corresponding to the application program.

An intelligent login module 33 is used for logging into the application program according to the user name and the password acquired by the application management module 32.

In a preferred embodiment, the fingerprint identification module 31 comprises an acquisition unit 310 and a determination unit 311. Further, the acquisition unit 310 comprises a first acquisition unit (not shown) and a second acquisition unit (not shown).

The first acquisition unit is used for acquiring a correct fingerprint information corresponding to a first application program when the to-be-authenticated fingerprint information inputted by the user is a single one.

The determination unit 311 is used for determining whether the to-be-authenticated fingerprint information is the same as the correct fingerprint information which corresponds to said application program and is acquired by the first acquisition unit.

The second acquisition unit is used for acquiring a correct fingerprint information corresponding to a next application program. Also, the determination unit 311 determines whether the to-be-authenticated fingerprint information is the same as the correct fingerprint information corresponding to said application program until a final application program that the user is required to log in.

In addition, when the user inputs plural to-be-authenticated fingerprint information, proceed with the following.

The acquisition unit 310 is further used for acquiring the correct fingerprint information corresponding to one or more application programs that the user is required to log in.

The determination unit 311 is further used for comparing the to-be-authenticated fingerprint information respectively with the correct fingerprint information corresponding to one application program and determining whether they are the same.

Alternatively, when the number of application programs the user is required to log in is two or more than two, compare the to-be-authenticated fingerprint information respectively with the correct fingerprint information corresponding to the plural application programs and determine whether they are the same.

In a preferred embodiment, the mobile terminal further comprises the following.

An indication module 34 is used for recording that the fingerprint information authentication of the application program is invalid when the fingerprint identification module 31 determines that the to-be-authenticated fingerprint information acquired by the application login module 30 is different from the correct fingerprint information which is locally preset and corresponds to the application program.

In a preferred embodiment, the mobile terminal further comprises the following.

A traditional login module 35 is used for launching a traditional login interface for prompting the user to log in by inputting the user name and the password when the repeat count of acquisition by the application login module 30 reaches a preset threshold. As described above, the preset threshold is a natural number smaller than 10. This not only can make sure the user to try to input plural to-be-authenticated fingerprint information appropriately, but also can keep away from stealing by other users. When the repeat count of acquisition by the application login module 30 exceeds the preset threshold, it also can choose an operation to call the police.

Of course, the mobile terminal further comprises a storage module 36, which is used for storing the correct fingerprint information which is locally preset, the correspondence between the user name and password of the application program and the correct fingerprint information, and the correspondence between the user names and passwords of plural accounts of the application program and plural correct fingerprint information. The acquisition unit 310 is connected to the storage module 36 and reads out the user name and password corresponding to the correct fingerprint information from the storage module 36, and then they are used to log in. In the context of understanding by a person skilled in the art, descriptions of the storage module 36 is not detailed herein.

In addition, the mobile terminal of the present invention further comprises a fingerprint capturer. The present invention is achieved by scanning and photographing the fingerprint via the fingerprint capturer, and processing the photographed fingerprint image to acquire an identification code.

In addition to above descriptions, the concrete operational principles of the mobile terminal of the present invention are referred to the afore-described application program login method for the mobile terminal, and they are not detailed herein.

By logging into the application program with fingerprint, the mobile terminal of the present invention and the application program login method thereof not only ensure the security of personal information, but also allow the user to quickly log into the application program. This improves user experience and is more practical.

The above descriptions merely serve as embodiments of the present invention, and the scope of the present invention is not limited thereto. Equivalent structure or procedure modifications made by referring to the specification and drawings of the present invention are maintained an included in the realm of the present invention, in addition to direct or indirect applications in other related technical fields.

What is claimed is:

1. A mobile terminal, comprising:
   an application login module for acquiring one or more to-be-authenticated fingerprint information inputted by a user when the user is required to log into one or more application programs that require login authentication; and
   a fingerprint identification module for determining whether the to-be-authenticated fingerprint information acquired by the application login module is the same as a correct fingerprint information which is locally preset and corresponds to the application program,
   said fingerprint identification module comprising:
   an acquisition unit for acquiring the correct fingerprint information;
   a determination unit for determining whether the to-be-authenticated fingerprint information is the same as the correct fingerprint information of each application program that the user is required to log in; and
   an indication module for recording that the fingerprint information authentication of the application program is invalid when the fingerprint identification module determines that the to-be-authenticated fingerprint information acquired by the application login module is different from the correct fingerprint information which is locally preset and corresponds to the application program;

said mobile terminal further comprising:
an application management module for acquiring, according to the to-be-authenticated fingerprint information, a user name and a password corresponding to the application program from a login information file which is locally preset when the fingerprint identification module determines that the to-be-authenticated fingerprint information is the same as the correct fingerprint information corresponding to the application program; and
an intelligent logion module for logging into the application program according to the user name and the password acquired by the application management module.

2. The mobile terminal according to claim 1, further comprising:
a traditional login module for launching a traditional login interface for prompting the user to log in by inputting the user name and the password.

3. The mobile terminal according to claim 1, wherein the acquisition unit further acquires the correct fingerprint information corresponding to one or more application programs that the user is required to log in when the to-be-authenticated fingerprint information inputted by the user includes two or more than two entities; and
wherein the determination unit compares each to-be-authenticated fingerprint information to the correct fingerprint information corresponding to the application program when the application program is the only one application program that the user is required to log in, and the determination unit compares the to-be-authenticated fingerprint information to the respective correct fingerprint information corresponding to the application programs when the user is required to log in two or more application programs.

4. An application program login method, comprising steps of:
acquiring one or more to-be-authenticated fingerprint information inputted by a user when the user is required to log into one or more application programs that require login authentication;
determining whether the to-be-authenticated fingerprint information is the same as a correct fingerprint information which is locally preset and corresponds to the application program;
recording that the fingerprint information authentication of the application program is invalid if not the same;
according to the to-be-authenticated fingerprint information, acquiring a user name and a password corresponding to the application program from a login information file which is locally preset if the to-be-authenticated fingerprint information is the same as the correct fingerprint information corresponding to the application program; and
logging into the application program according to the user name and the password,
wherein the step of determining whether the to-be-authenticated fingerprint information is the same as the correct fingerprint information which is locally preset and corresponds to the application program comprises:
acquiring a correct fingerprint information corresponding to a first application program and determining whether the to-be-authenticated fingerprint information is the same as the correct fingerprint information corresponding to the first application program;
if not the same, acquiring a correct fingerprint information corresponding to a next application program and determining whether the to-be-authenticated fingerprint information is the same as the correct fingerprint information corresponding to the next application program, until a final application program that the user is required to log in; and
if the same, processing the step of acquiring, according to the to-be-authenticated fingerprint information, the user name and the password corresponding to the first application program from the login information file which is locally preset, and then acquiring the correct fingerprint information corresponding to the next application program and determining whether the to-be-authenticated fingerprint information is the same as the correct fingerprint information corresponding to the next application program, until a final application program that the user is required to log in.

5. The method according to claim 4, before the step of acquiring the correct fingerprint information corresponding to the next application program if not the same, said method further comprising:
repeating acquisition of the to-be-authenticated fingerprint information inputted by the user and the correct fingerprint information corresponding to the recorded application program of which the fingerprint information authentication is invalid, and then processing the step of determining whether the to-be-authenticated fingerprint information is the same as the correct fingerprint information corresponding to said application program until a repeat count of acquisition reaches a preset threshold, or until the user ceases logging into the application program.

6. The method according to claim 5, further comprising:
launching a traditional login interface for prompting the user to log in by inputting the user name and the password if the repeat count of acquisition reaches the preset threshold.

7. The method according to claim 4, wherein the step of determining whether the to-be-authenticated fingerprint information is the same as the correct fingerprint information which is locally preset and corresponds to the application program further comprises:
if the to-be-authenticated fingerprint information inputted by the user comprises two or more than two entities, acquiring the correct fingerprint information corresponding to one or more application programs that the user is required to log in;
comparing each to-be-authenticated fingerprint information to the correct fingerprint information corresponding to the application program when the application program is the only one application program that the user is required to log in; and
comparing the to-be-authenticated fingerprint information to the respective correct fingerprint information corresponding to the application programs when the user is required to log in two or more application programs.

8. An application program login method, comprising steps of:
acquiring one or more to-be-authenticated fingerprint information inputted by a user when the user is required to log into one or more application programs;
acquiring correct fingerprint information which is locally preset and corresponds to the application programs;
determining whether the to-be-authenticated fingerprint information is the same as the correct fingerprint information of each application program that the user is required to log in;
recording that the fingerprint information authentication of the application program is invalid if not the same; and logging into the respective application programs, of which the correct fingerprint information is the same as the to-be-authenticated fingerprint information.

9. The method according to claim 8, wherein the step of logging into the respective application programs, of which the correct fingerprint information is the same as the to-be-authenticated fingerprint information comprises:
   acquiring a user name and a password corresponding to the application program from a login information file which is locally preset; and
   logging into the application program by using the user name and the password.

10. The method according to claim 8, further comprising:
    prompting the user to bind a fingerprint with the application program after the user logs into the application program successfully by inputting a user name and a password.

11. The method according to claim 8, further comprising:
    prompting the user to bind a fingerprint with the application program after finishing downloading the application program.

12. The method according to claim 8, further comprising:
    binding a same correct fingerprint information to plural application programs.

13. The method according to claim 8, further comprising:
    highlighting the application programs having a same correct fingerprint information with a same color.

14. The method according to claim 8, further comprising:
    showing the application programs that the to-be-authenticated fingerprint information is able to be used to log into boldly for prompting the user to select.

* * * * *